(12) United States Patent
Foley et al.

(10) Patent No.: US 9,367,405 B1
(45) Date of Patent: Jun. 14, 2016

(54) MANAGING SOFTWARE ERRORS IN STORAGE SYSTEMS

(71) Applicant: EMC Corporation, Hopkinton, MA (US)

(72) Inventors: Robert P. Foley, Clinton, MA (US); Peter Puhov, Shrewsbury, MA (US); Marc C. Cassano, Medway, MA (US); Daniel E. Cummins, Hudson, NH (US); David W. Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 152 days.

(21) Appl. No.: 13/804,506

(22) Filed: Mar. 14, 2013

(51) Int. Cl.
*G06F 11/14* (2006.01)

(52) U.S. Cl.
CPC .................................. *G06F 11/1474* (2013.01)

(58) Field of Classification Search
CPC .............. G06F 11/2007; G06F 11/008; G06F 11/2092; G06F 11/2094
USPC .......................................................... 714/4.11
See application file for complete search history.

(56) References Cited

U.S. PATENT DOCUMENTS

| | | | |
|---|---|---|---|
| 6,496,318 B1* | 12/2002 | Sukigara et al. | 360/73.03 |
| 8,051,335 B1* | 11/2011 | Reimers et al. | 714/43 |
| 8,711,684 B1* | 4/2014 | Usgaonkar et al. | 370/228 |
| 2005/0091441 A1* | 4/2005 | Qi et al. | 711/5 |
| 2008/0082856 A1* | 4/2008 | French et al. | 714/2 |
| 2009/0259882 A1* | 10/2009 | Shellhamer | 714/7 |
| 2010/0161852 A1* | 6/2010 | Veni et al. | 710/38 |

* cited by examiner

*Primary Examiner* — Jigar Patel
(74) *Attorney, Agent, or Firm* — Krishnendu Gupta; Jason A. Reyes; Deepika Bhayana

(57) ABSTRACT

A method is used in managing software errors in storage systems. It is detected that a first processor of a storage system has a problem performing an I/O on a logical object. The first processor has a first path to the logical object. The problem includes a software error. Whether responsibility of performing the I/O on the logical object is transferred to a second processor of the storage system is evaluated. The second processor has a second path to the logical object.

20 Claims, 7 Drawing Sheets

MANAGING SOFTWARE ERRORS IN STORAGE SYSTEMS

BACKGROUND

1. Technical Field

This application relates to managing software errors in storage systems.

2. Description of Related Art

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Further, disk arrays included in a data storage system may use a variety of storage devices with various characteristics for providing storage to a user. Each disk array may logically operate as a unified storage device. A data storage system may also include one or more storage array processors (SPs), for handling requests for storage allocation and input/output (I/O) requests. A storage processor (SP) in a disk array is the controller for and primary interface to the disk array. Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a unified disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level. LUNs are managed for use at the application level by paired storage processors (SPs). Ownership of a LUN is determined when the LUN is mounted by the application, with one of the paired SPs designated as the owner SP and the other SP acting as a backup processing device for the owner SP.

Ownership of a LUN may change under a variety of circumstances. For example, ownership of a LUN may migrate from one SP to another SP for host load balancing reasons, for host failover events, for SP failures, and for manual trespass operations initiated by a user at an application level. The term "trespass," as used herein, refers to a change of ownership of a LUN from one SP to another SP. Host failover is a process by which a storage processor is eliminated as a single point of failure by providing hosts the ability to move the ownership of a LUN from one storage processor to another storage processor.

SUMMARY OF THE INVENTION

A method is used in managing software errors in storage systems. It is detected that a first processor of a storage system has a problem performing an I/O on a logical object. The first processor has a first path to the logical object. The problem includes a software error. Whether responsibility of performing the I/O on the logical object is transferred to a second processor of the storage system is evaluated. The second processor has a second path to the logical object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1A:
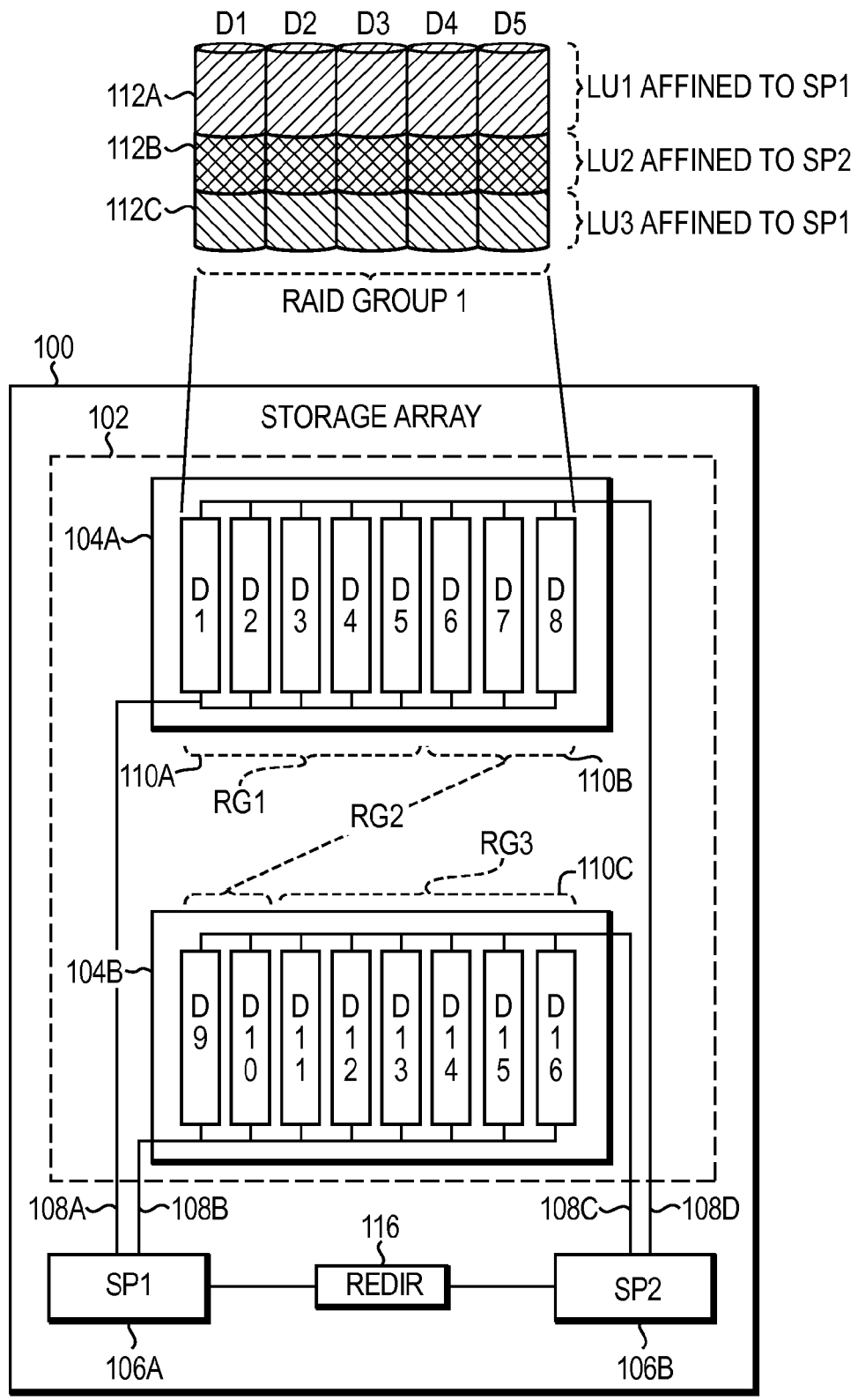
FIGS. 1A, 1B and 2 are examples of an embodiment of a computer system that may utilize the techniques described herein.

Described below is a technique for use in managing software errors in storage systems, which technique may be used to provide, among other things, detecting that a first processor of a storage system has a problem performing an I/O on a logical object, wherein the first processor has a first path to the logical object, wherein the problem includes a software error, and evaluating whether to transfer responsibility of performing the I/O on the logical object to a second processor of the storage system, wherein the second processor has a second path to the logical object.

Generally, in a data storage system, a set of one or more LUNs associated with a set of disk drives in a RAID group may be accessed by a storage processor. As a result, the storage processor may be responsible for all communications directed to the set of one more LUNs. Conventionally, when a storage processor encounters an error accessing a set of disk drives due to a problem, the storage processor panics and an alternate path to the set of disk drives is determined. Upon finding an alternate path, in such a conventional system, the set of one or more LUNs associated with the set of disk drives in the RAID group are accessed by an alternate storage processor having the alternate path and I/Os from a host system are redirected to that alternate storage processor.

However, certain kinds of failures can occur in which a storage array is left in an inconsistent or unusable state. For example, a power failure may cause a storage processor of a storage system to fail. Further, for example, a storage processor of a storage system may fail due to a hardware or a software defect. Further, for example, a set of disk drives of a storage system may lose power causing the set of disk drives to fail.

Typically, an error such as a software error may either be a non-critical error which may be recoverable or a critical error which may not be recoverable. A critical error results into panicking a storage system. A non-critical error occurs unexpectedly but a storage system software may handle the non-critical error gracefully by recovering from the error.

Generally, a software error occurs unexpectedly during processing of I/Os in a storage system and may indicate software bugs in a storage software of the storage system. For example, a software error may include an unexpected status as a response to an operation, check for a NULL pointer which fails unexpectedly, and an unexpected state of an object.

Conventionally, when a software error occurs during processing of I/O requests in a storage system, a storage processor of the storage system executing the I/O requests fails and reboots (also referred to herein as "panics"). In such a conventional system, a storage processor does not attempt to recover from a software error which may be transient in nature indicating that the storage processor may recover from the software error upon retrying an operation which failed due to the software error. Further, in such a conventional system, a storage processor of a storage system that encounters a software error fails and reboots even when no alternate storage processor is available in the storage system thereby causing a data unavailable condition where a user is unable to access any data of the storage system. Further, in such a conventional system, even when an alternate storage processor is available in a storage system for performing an I/O operation, the alternate storage processor may encounter the same software error or similar software errors thereby causing both storage processors to go into a rolling panic situation thereby making the complete storage system inaccessible to a user because both storage processors panics simultaneously and repeatedly. Further, in such a conventional system, panicking a storage processor of a storage system due to a software error may cause additional secondary software failures in the storage system. Thus, in such a conventional system, a storage processor panics every time the storage processor encounters a software error.

By contrast, in at least some implementations in accordance with the technique as described herein, a storage processor upon encountering a software error first attempts to retry an operation causing the software error thereby avoiding panicking the storage processor if the software error is resolved upon retrying the operation. Further, in at least one embodiment of the current technique, a storage processor may only panic if an alternate storage processor is available and grants permission to the storage processor to panic. In such a case, if an alternate storage processor is unavailable, a logical object (e.g., a LUN) that has encountered a software error is marked as failed by making the logical object inaccessible. Thus, in such a case, a data unavailable situation occurs only for a logical object of a storage system which has encountered a software error instead of the entire storage system being unavailable. Thus, in at least one embodiment of the current technique, software errors are handled in such a way that a storage system attempts to recover from unexpected conditions caused by software failures. A goal of the current technique is to reduce data unavailable and/or data loss situations when an I/O operation fails due to a software error. Further, a goal of the current technique is to reduce or eliminate situations in which every storage processor of a storage system may fail simultaneously and/or repeatedly.

In at least one embodiment of the current technique, when a software error is encountered during execution of an I/O request while accessing a set of disk drives or a RAID group including the set of disk drives, the software error is provided back to a LUN object associated with the set of disk drives. In at least one embodiment of the current technique, upon receiving the software error, the LUN object retries the I/O request in an attempt to resolve the software error in case the software error is transient in nature indicating that the error may not reoccur. A transient error, for example, may include a timing problem such that an I/O operation may encounter an unexpected state during a small window of time where the unexpected state may change to a valid state after the small window of time passes. Further, in at least one embodiment of the current technique, if a retry of an I/O operation by a storage processor does not resolve a software error encountered during the I/O operation and an alternate (also referred to herein as "peer") storage processor is available, the storage processor communicates (also referred to herein as "negotiates") with the alternate storage processor to determine whether the storage processor can panic. In such a case, based on the determination that the storage processor can fail, the storage processor panics thereby causing redirection of I/O operations for the storage processor to the alternate storage processor which allows the storage processor to reboot thereby clearing any unexpected and/or invalid states of objects in a memory. Further, in at least one embodiment of the current technique, if a retry of an I/O operation by a storage processor does not resolve a software error encountered during the I/O operation and an alternate storage processor is unavailable, a logical object associated with the I/O operation is taken offline thereby avoiding a data unavailability situation for the entire storage system. Further, by taking the logical object offline instead of panicking the storage processor, a rolling panic situation for multiple storage processors of the storage system is avoided as alternate storage processors in the storage system may have panicked due to the same software error.

In at least some implementations in accordance with the technique as described herein, use of managing software errors in storage systems can provide one or more of the following advantages: improving data storage system performance by efficiently recovering from software failures in a data storage system, increasing system availability by eliminating or reducing failures of storage processors of a storage system, and eliminating or reducing degraded I/O performance during read or write operations by containing a fault to a logical object associated with a software error instead of failing the entire storage system.

Referring now to FIG. 1A, shown is an example of an embodiment of a computer system that may be used in connection with performing the technique or techniques described herein. Data storage system 100 includes multiple storage devices 102, which are typically hard disk drives, but which may be tape drives, flash memory, flash drives, other solid state drives, or some combination of the above. In at least one embodiment, the storage devices may be organized into multiple shelves 104, each shelf containing multiple devices 102. In the embodiment illustrated in FIG. 1A, data storage system 100 includes two shelves, Shelf1 104A and Shelf2 104B; Shelf1 104A contains eight storage devices, D1-D8, and Shelf2 also contains eight storage devices, D9-D16.

Data storage system 100 may include one or more storage processors 106, for handling input/output (I/O) requests and allocations. Each storage processor 106 may communicate with storage devices 102 through one or more data buses 108.

In at least one embodiment, data storage system 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of data storage system 100, as illustrated in FIG. 1A, is for illustrative purposes only, and is not considered a limitation of the current technique described herein. It should be noted that a data storage system may include more than two storage processors.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1A, RG1, which includes storage devices D11-D5, is sub-divided into 3 logical units, LU1 112A, LU2 112B, and LU3 112C.

Figure 1B:
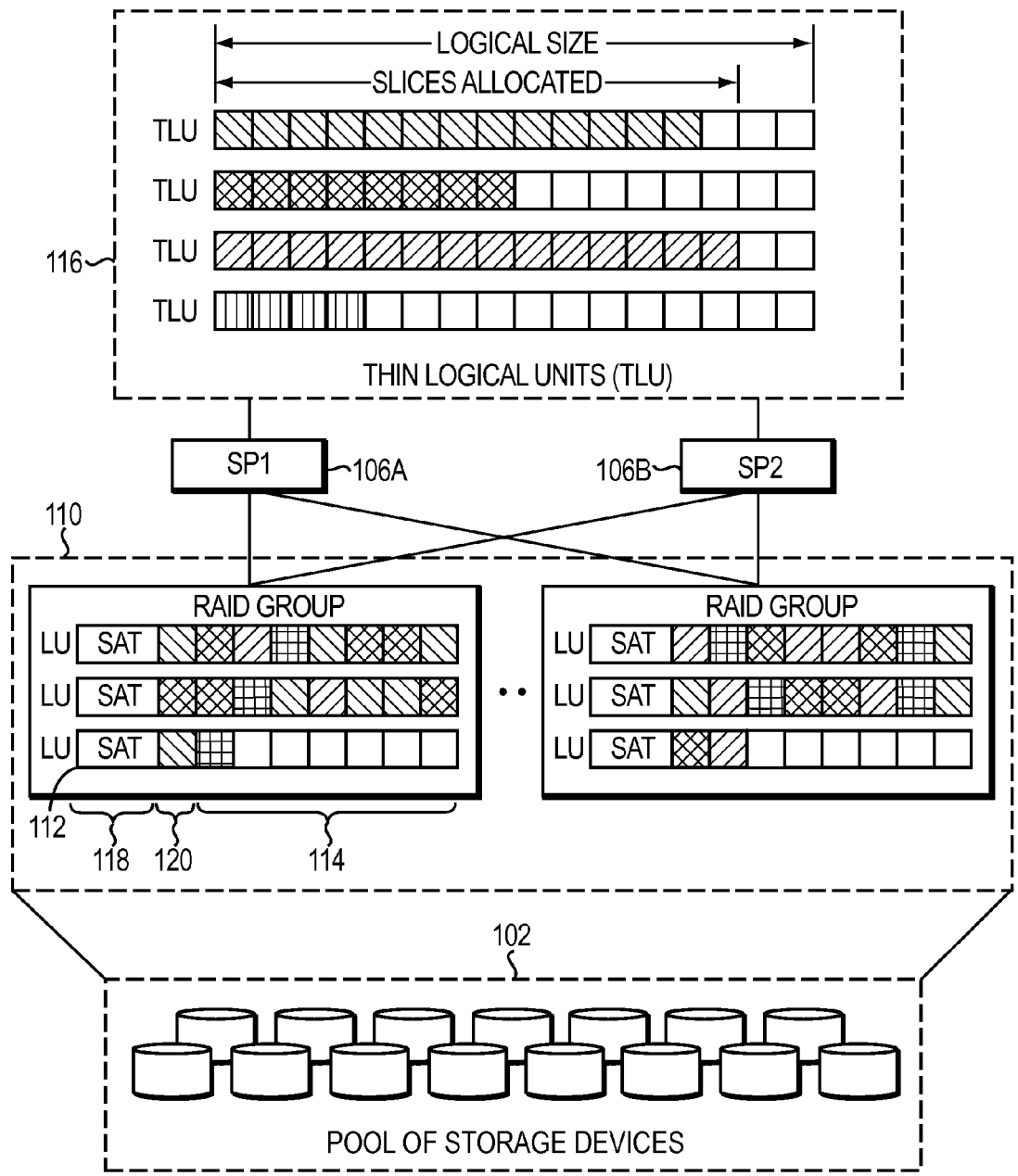

FIG. 1B is a block diagram illustrating another view of an embodiment of a computer system that may be used in connection with performing the technique or techniques described herein. In the simplified view shown in FIG. 1B, a pool of storage devices 102 are organized into multiple RAID groups 110, and each RAID group is further divided into a number of LUs from which slices 114 are allocated to one or more thin logical units (TLUs) 116. TLUs 116 may have a logical size that is larger than the current actual size. The actual size is determined by the number of slices actually allocated to the TLU 116. The slices that are allocated to a TLU 116 may be physically located anywhere in storage array 100. Further, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. Storage processors 106A, 106B may maintain information about the structure of the file system whose contents are being stored in the allocated slices. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

In at least one embodiment, in order to avoid contention between two or more storage processors 106A, 106B attempting to modify a particular SAT 118, each SAT 118 is controlled by only one storage processor 106. The storage processor 106 that has been given ownership of a particular SAT 118 is hereinafter referred to as the "claiming SP" for that SAT 118. Since the SAT 118 for a logical unit 112 contains information about slices within that logical unit 112, the claiming SP of a SAT 118 may be said to be the claiming SP of the logical unit, also. The remaining storage processors 106 that are not the claiming SP for a logical unit 112 are hereinafter referred to as the "peer SP". Thus, every logical unit 112 may have one claiming SP and one or more peer SPs. Since the claiming SP may be determined for each logical unit 112 individually, logical units within the same RAID group 110 may have different claiming SPs. As used herein, the term "affining" refers to the process of associating a logical unit 112 to a storage processor 106, which then becomes the claiming SP of that logical unit 112. The term "affinity" refers to a characteristic of a logical unit 112, the characteristic indicating the association of that logical unit 112 to a particular storage processor 106. A logical unit 112 is said to have an affinity for or toward a specific storage processor 106.

In at least one embodiment, if one storage processor 106 receives an I/O request for a slice that resides within a logical unit 112 that has been affined to another storage processor 106, that I/O request may be denied, since the first storage processor does not have access to the slice allocation table for the logical unit 112 in question. In an alternative embodiment, a request for I/O access to a particular logical unit 112 may be redirected from peer SP that received the request to the claiming SP via a redirector 116. However, redirection incurs a performance penalty due to the time taken to detect the improper request, identify the appropriate storage processor, and redirect the request to the identified storage processor.

Similarly, in at least one embodiment, a peer SP may not be permitted to have allocated to it slices from a logical unit 112 claimed by another SP. For example, referring to FIG. 1A, SP1 106A may not be allowed to have slices from LU2 112, since that LU has been affined to SP2 106B. In this scenario, the slices on LU2 112 are said to be "orphaned" with respect to any peer SP, which in this example is any storage processor 106 other than SP2 106B. Thus, the slices on LU2 112 are orphaned with respect to SP1 106A.

Figure 2:
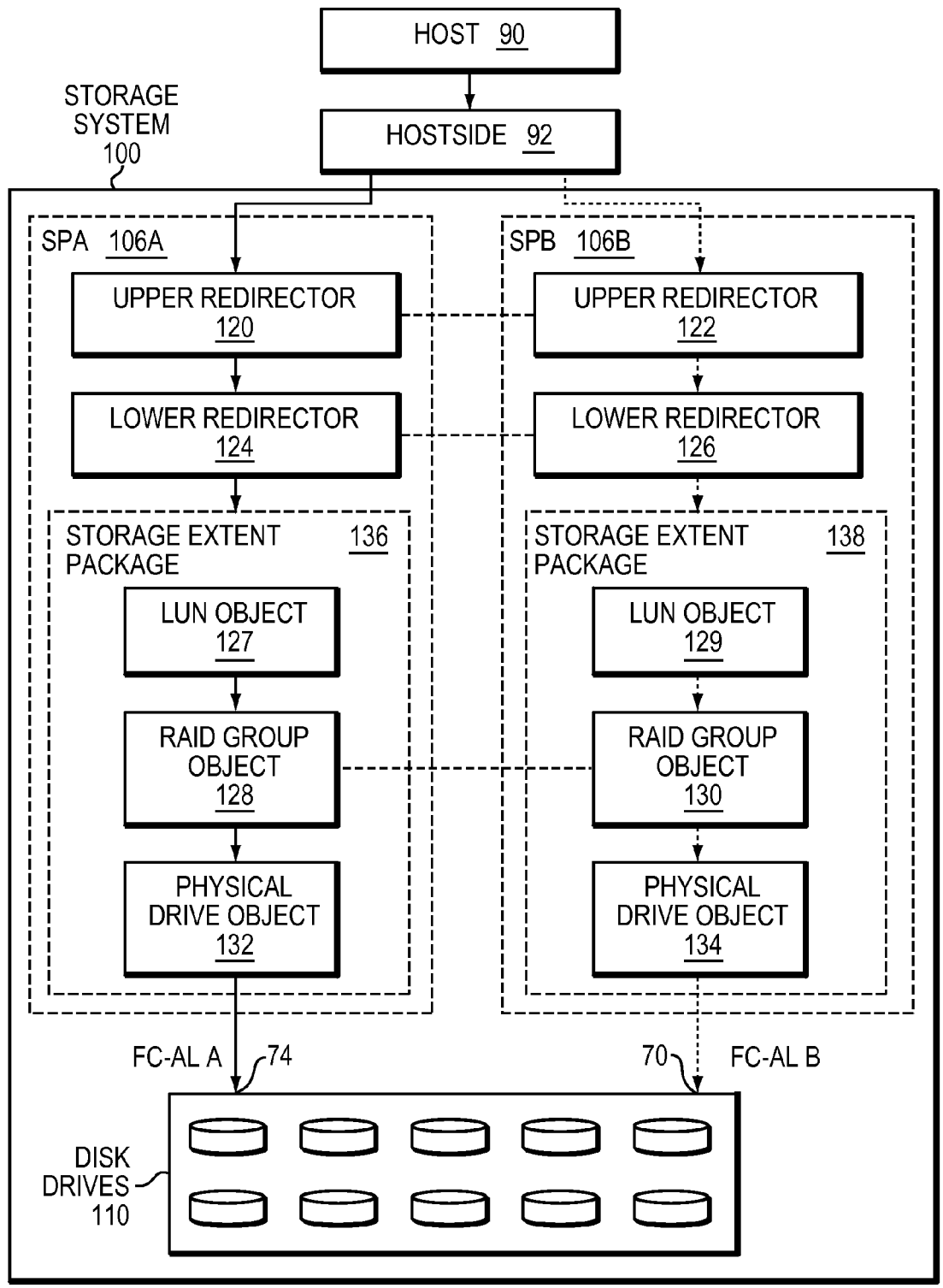

Referring to FIG. 2, shown is more detailed representation of components that may be included in an embodiment using the techniques herein. With reference also to FIGS. 1A and 1B, in a data storage system such as data storage system 100, a storage processor provides communications between host system 90 and disk drives 110. Data storage system 100 includes at least two storage processors 106A, 106B. Storage Processor (SPA) 106A accesses the disk drives 110 using communication loop (e.g., SAS) FC-AL 74 and storage processor (SPB) 106B accesses the disk drives 110 using communication loop FC-AL 70 (e.g. SAS).

Host system 90 may not address the disk drives of the storage systems directly, but rather access to data may be provided to one or more host systems from what the host systems view as a plurality of logical devices or logical volumes ("LVs" or "LUNs"). Host system 90 sends a request to hostside logic ("hostside") (e.g., hostside 92) to access data stored on logical devices. The hostside 92 sends appropriate status back to the host system 90 in case access to data fails. The LVs may or may not correspond to the physical disk drives. For example, one or more LVs may reside on a single physical disk drive. Data in a single data storage system may be accessed by multiple hosts allowing the hosts to share the data residing therein. Regarding terminology related to a storage system, the host or host network is sometimes referred to as the front end and from disk adapters toward the disks is sometimes referred to as the back end. A disk adapter is a component that allows disk drives to communicate with a storage processor.

In at least some systems, one storage processor ("primary SP") is primarily responsible for all communications with a set of LUNs associated with disk drives in a data storage system, and one or more other SPs may be primarily responsible for all communications with other sets of LUNs associated with disk drives in the data storage system. The primary SP is also known as the owner SP. When a failure occurs for a set of disk drives in communication with a primary SP, the data storage system 100 shuts down the affected disk drives on that primary SP, in turns shutting down a set of one or more LUNs associated with the affected drives. On determining that the other SP can access the set of disk drives, a trespass command is issued to the other SP that transfers the responsibility of communication with the affected disk drives to the other SP, in effect causing the other SP to become the new primary SP for the affected disk drives. Thus, ownership of the set of one or more LUNs is transferred to the new primary SP. For example, host 90 sends an I/O request through hostside 92 to storage processor SPA 106A. Based on the I/O request, SPA 106A sends corresponding data requests to disk drives 110 through upper redirector 120, lower redirector 124, storage extent package 136. Upper redirector 120 and lower redirector 124 enable the data storage system to provide an alternate path to a set of disk drives by redirecting I/Os from one SP to another SP.

Storage extent package 136 includes LUN object 127, RAID group object 128 and physical drive object 132 that enables the data storage system to interact with disk drives 110. Storage extent package 136 communicates with other storage processors in the data storage system in order to enable the data storage system to determine an alternate path to a set of disk drives. RAID group object 128 may detect a failure (such as a software error) where communication loop FC-AL A 74 cannot access LUNs on a set of disk drives in a RAID group. It should be noted that detection of a failure may happen at any of different places within a storage processor. For example, RAID group object 128 in communication with physical drive object 132 may detect a failure when SPA 106A accesses data from a set of disk drives 110. Upon detection of a failure, a status indicating the failure is passed up stream through components such as physical drive object 132 to RAID group object 128 to LUN object 127 and so on so forth. Upon receiving the status indicating the failure, LUN object 127 communicates with LUN object 129 of SPB 106B and perform negotiations regarding whether a storage processor can panic and which storage processor can panic. If SPA 106A fails and a permission is granted to SPA 106A to panic, responsibility of communication with the set of disk drive in RAID group changes from SPA 106A to SPB 106B. In such a case, I/Os from host 90 are redirected to SPB 106B. Storage Processor SPB 106B then services those I/Os by sending the I/O requests to disk drives 110 through upper redirector 122, lower redirector 126, storage extent package 138 which includes LUN object 129, RAID group object 130 and physical drive object 134, and communication loop FC-AL B 70. Lower redirectors 124 and 126 may also handle rejected read/write I/Os that were rejected because a set of disk drives are inaccessible due to a failure on SPA 106B or SPB 106A. In that case, I/Os targeted for the set of disk drives may also be redirected to a peer SP (e.g., I/Os from SPA 106A may be redirected to SPB 106B in case of a failure on SPA 106A and I/Os from SPB 106B may be redirected to SPA 106A in case of a failure on SPB 106B) and those redirected I/Os could also fail due to any number of reasons on the peer SP. In that case, lower redirectors 124 and 126 retries the failed I/Os on their respective local SPs again.

Figure 3:
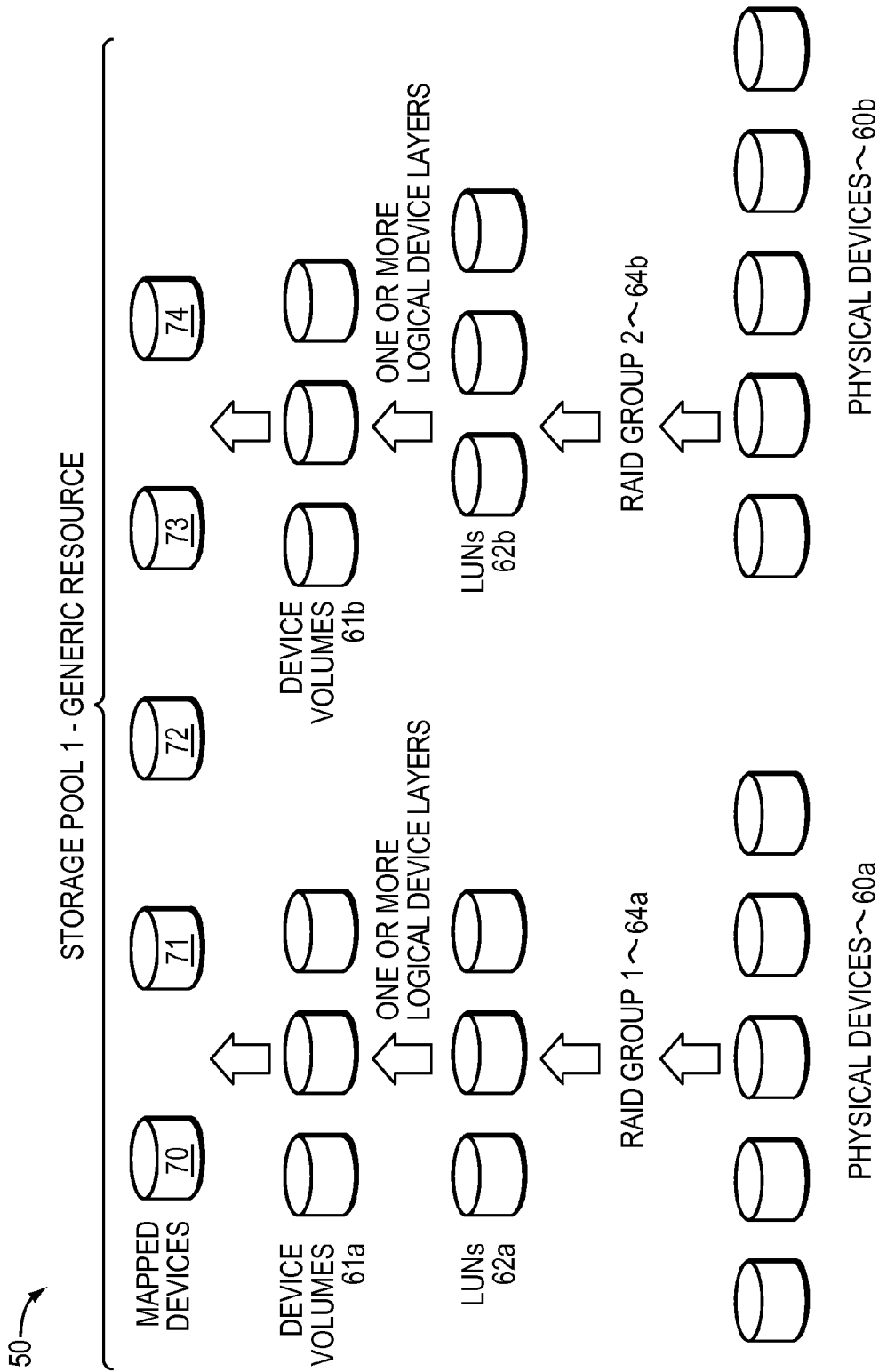
FIG. 3 is an example illustrating storage device layout.

Referring to FIG. 3, shown is an example representing how data storage system best practices may be used to form storage pools. A storage pool may be a collection of disks, which may include disks of different types. A disk may be a physical disk within the storage system. A LUN may be a logical unit number which is an identifier for a Logical Unit. In at least one embodiment of the current technique, the example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 4:
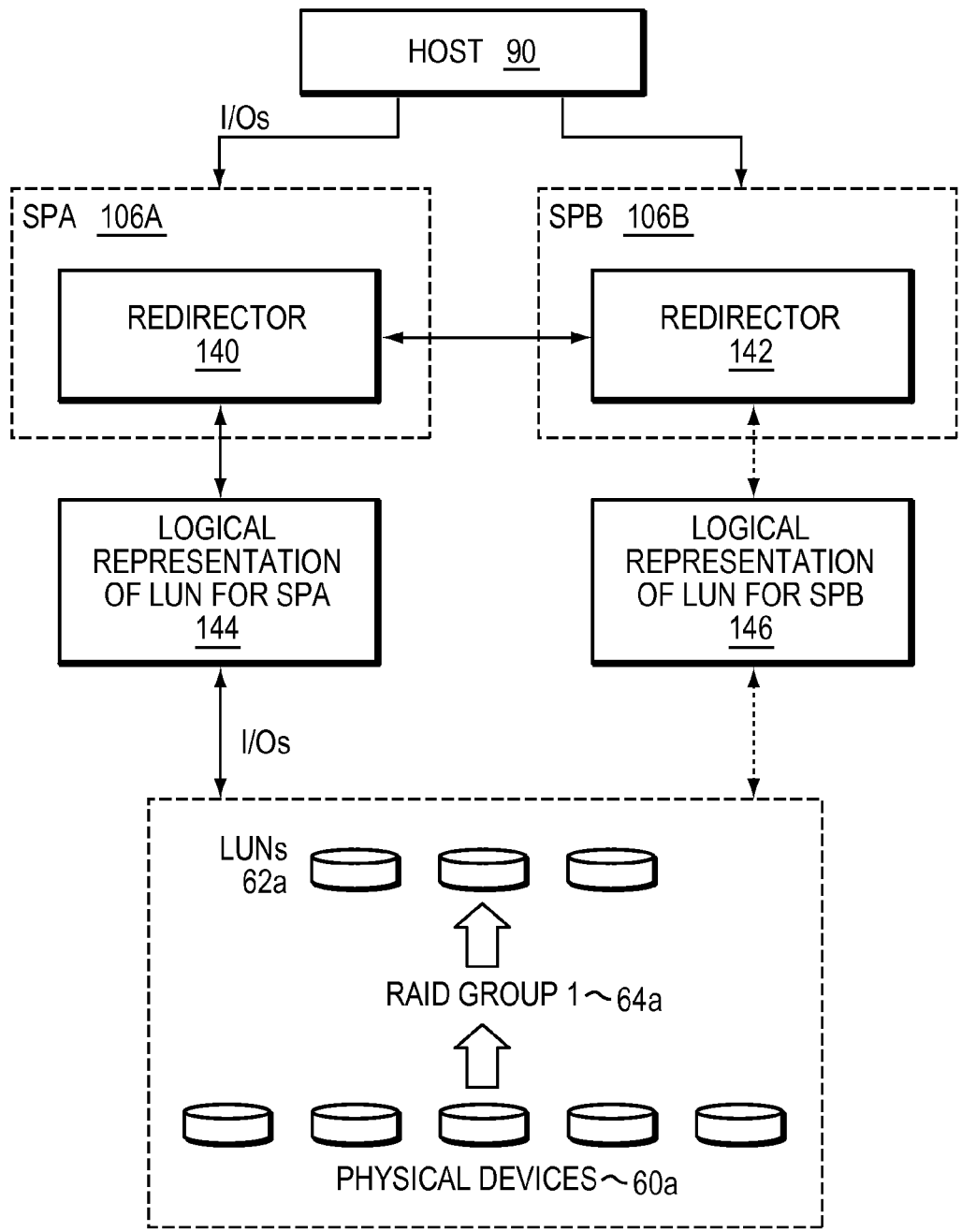
FIGS. 4-5 are diagrams illustrating in more detail components that may be used in connection with techniques herein.

Referring to FIG. 4, shown is representation of components that may be included in an embodiment using the techniques herein. With reference also to FIGS. 1-3, a primary storage processor is the owner of a set of LUNs associated with a set of disk drives in data storage system 100. Ownership of a LUN indicates that commands including I/O requests directed to the LUN may only succeed if issued to a storage extent package of a storage processor that owns the LUN. Commands that do not require ownership can succeed when issued to any storage processor in the data storage system irrespective of whether the storage processor owns the LUN. For example, in FIG. 4, SPA 106A is primarily responsible for all communications with LUN 62a and thus is the owner of the LUN 62a. If host 90 issues a command requiring ownership including an I/O request to SPB 106B directed to LUN 62a, the command may be rejected by SPB 106B and the command may fail. However, a trespass of ownership from SPA 106A to SPB 106B may occur at a later time for any number of reasons.

In at least one embodiment of the current technique, LUN 62a is logically represented by a logical object 144 to storage processor SPA 106A. Similarly, another logical instance of the LUN 62a exists to represent the LUN 62a to SPB 106B. Storage processors SPA 106A and SPB 106B communicate with each other using redirector components 140, 142.

Figure 5:
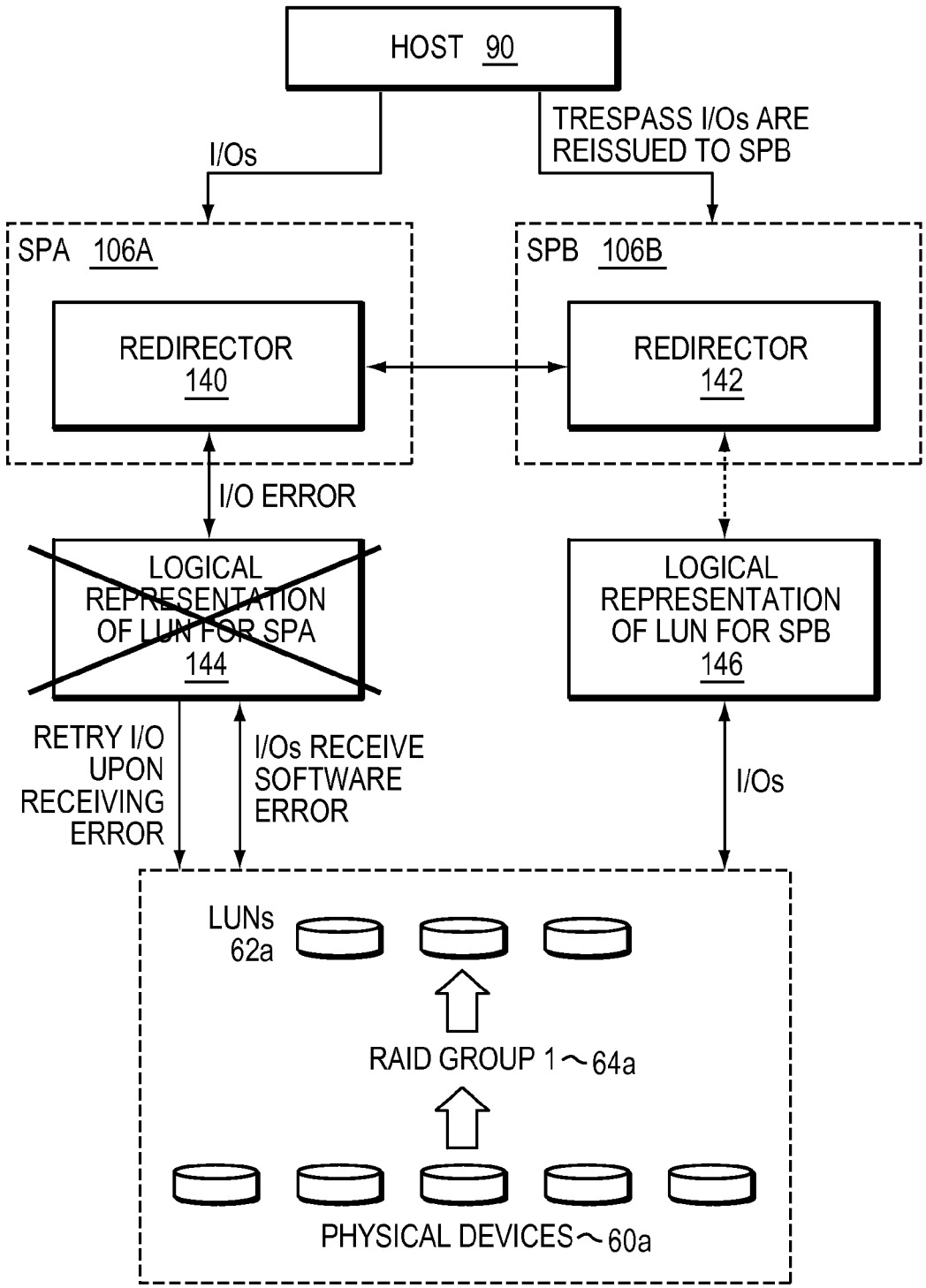

Referring to FIG. 5, shown is representation of components that may be included in an embodiment using the techniques herein. With reference also to FIGS. 1-4, if an error is encountered when performing an I/O operation on a set of disk drive 60a in a RAID group 64a, the error is provided to the logical LUN object 144. Upon encountering the error, logical LUN object 144 retries the I/O operation. If the retry of the I/O operation fails, logical LUN object 144 of SPA 106A communicates with SPB 106B to determine whether SPA 106A can panic. Upon determining that SPA 106A can panic, SPA 106A reboots. As a result, host 90 redirects all I/O requests to SPB 106B such that logical LUN object 146 is used by SPB 106B to access LUN 62a thereby transferring the ownership of LUN 62 from SPA 106A to SPB 106B. However, in another embodiment, another component of SPA 106A may communicate with SPB 106B to determine whether SPA 106A can panic.

Thus, in at least one embodiment of the current technique, if a storage processor encounters a software error during an I/O operation, information regarding the software error is percolated up a software stack instead of immediately failing and rebooting the storage processor as performed in a conventional system. In at least one embodiment of the current technique, when a software error is percolated up to a logical object representing a LUN which encountered the software error, the logical object retries the I/O operation at least one more time. In such a case, if the retry of the I/O operation is successful, the storage processor is able to complete the I/O operation successfully without performing additional operations thereby also avoiding reboot of the storage processor. However, if the retry of the I/O operation fails, the logical LUN object may log a message indicating that the LUN encountered the software error. Further, in such a case, when the retry of the I/O operation fails, the storage processor communicates with a peer storage processor to determine whether the storage processor can panic. If the software error is encountered by only one storage processor, that storage processor is granted permission by an alternate storage processor to reboot by panicking the storage processor. However, if no alternate storage processor is available, the logical LUN object fails thereby making the LUN inaccessible in order to isolate the software failure to the LUN instead of panicking the storage processor thereby making the entire storage system unavailable.

In at least one embodiment of the current technique, when at least two storage processors encounters software errors on either one or both storage processors, a logical LUN object representing a LUN on the first storage processor communicates with the second storage processor to determine which storage processor can panic. Generally, one of the two storage processors is considered as an active storage processor and the other storage processor is considered as a passive storage processor. An active storage processor is a storage processor that has been rebooted first. Further, an active storage processor makes a determination as to which storage processor can reboot upon encountering an error. If both active and passive storage processors encounter software errors when accessing a LUN, the active storage processor allows the first request to access the LUN to succeed and denies further I/O requests for the LUN. Thus, for example, in FIG. 5, if both storage processors SPA 106A and SPB 106B encounter software errors simultaneously or one after another, the active SP (e.g., SPA 106A) may decide to panic itself instead of panicking SPB 106B when negotiations occurs between the two storage processors to determine which storage processor can panic. In such a case, the peer SP 106B transitions the logical object 146 to a failed state when the active SP 106A panics because permission to panic is not granted to the passive SP 106B.

Further, in at least one embodiment of the current technique, if software errors occurs on different LUNs on at least two different storage processors of a storage system simultaneously, the first LUN requesting to panic is granted permission to fail and panic when negotiations occurs between the at least two different storage processors. Thus, in such a case, a passive SP requests an active SP to make a decision even if a software error has occurred on the passive SP. Thus, for example, if a LUN (e.g., LUN-0) encounters a software error on SPA 106A designated as the active storage processor and another LUN (e.g., LUN-1) encounters a software error on SPB 106B designated as the passive storage processor and if the request to panic LUN-1 is evaluated on SPA 106A before the request to panic LUN-0 is evaluated, LUN-1 is granted permission to panic thereby causing SPB 106B to fail and reboot. In such a case, LUN-0 is denied the permission to reboot and thus LUN-0 transitions to a failed state when SPB 106B panics.

Further, in at least on embodiment of the current technique, if the retry of an I/O operation for a LUN fails on a storage processor and the storage processor is granted permission to panic by an alternate storage processor, the alternate storage processor may fail as well due to the same or similar software error. In such a case, the LUN is marked offline for both storage processors. However, a situation may occur where both storage processors may keep panicking simultaneously. In such a case, a counter may be maintained which tracks how many times a storage processor reboots and based on the value of the counter, a storage system may decide to stop rebooting each storage processor and mark a LUN offline in such a way that the LUN does not become accessible when failed storage processors reboots.

Further, it should be noted that if a software error occurs for a LUN accessed through a storage processor when performing an I/O operation, the I/O operation may be retried on an alternate storage processor instead of retrying the I/O operation on the storage processor as described above herein. In such a case, if the I/O operation is successful, redirection of I/O operations to the alternate storage processor continues. Further, if the I/O operation succeeds on the alternate storage processor, logical representation for the LUN is recreated. However, if the retry of the I/O operation on the alternate storage processor fails, the LUN is marked offline.

Figure 6:
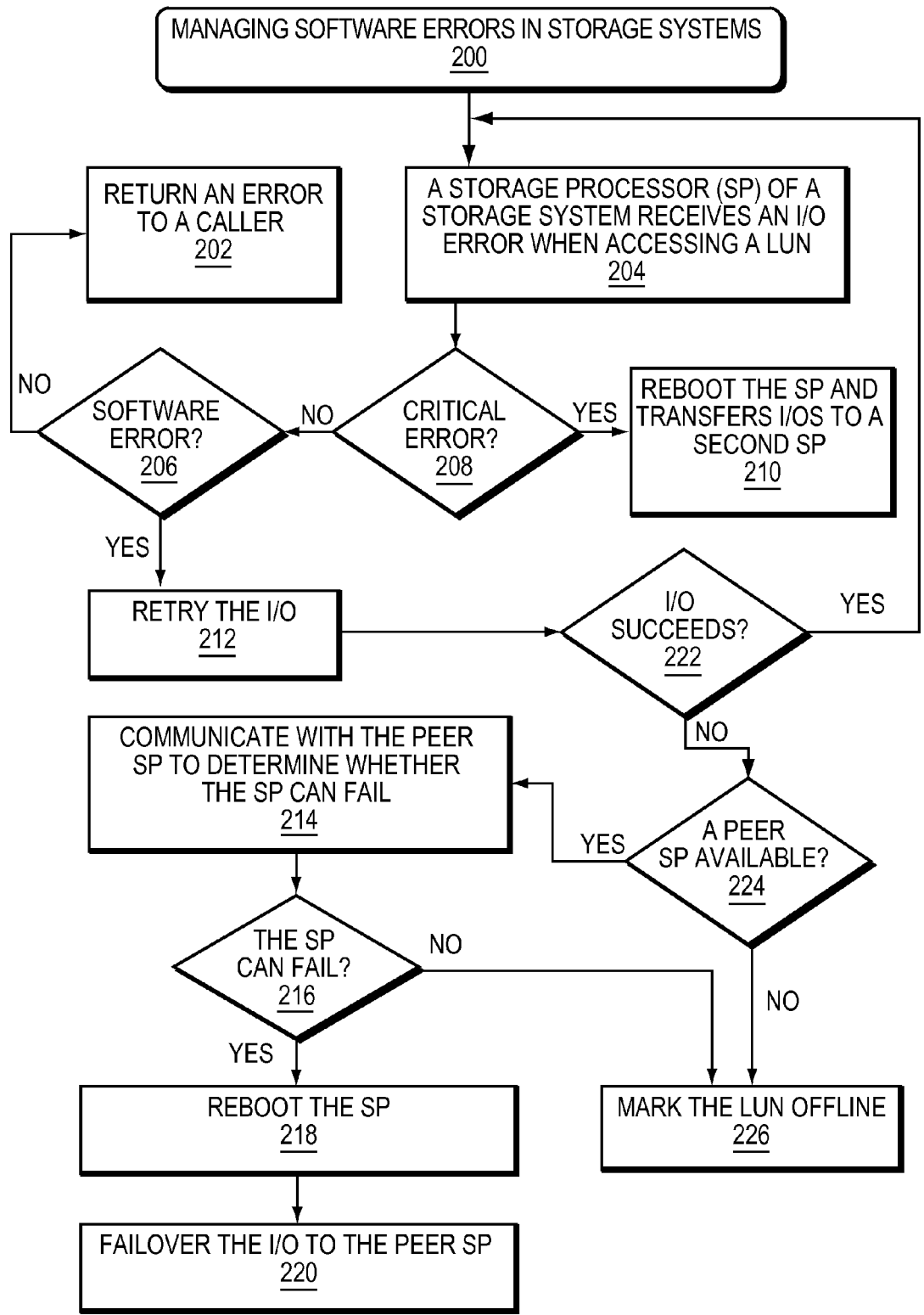
FIG. 6 is a flow diagram illustrating processes that may be used in connection with techniques herein.

Referring to FIG. 6, shown is a flow diagram illustrating the method of managing software errors in a data storage system. With reference also to FIGS. 1-5, software errors are managed in a storage system (step 200). In at least one embodiment of the current technique, when a storage processor encounters an error during execution of an I/O operation while accessing a set of disk drives associated with a LUN, a determination is made as to the type of the error (step 204). If the error is a critical error which may not be recovered from (step 208), the storage processor is rebooted and subsequent I/O operations to the LUN are redirected to an alternate storage processor of the storage system (step 210). If the error is a software error which may be recovered from (step 206), the storage processor retries the I/O operation (step 212). If the retry of the I/O operation is successful, the I/O operation completes successfully (step 222). However, if the retry of the I/O operation in not successful, a determination is made as to whether an alternate storage processor of the storage system is available (step 224). Upon determination that an alternate storage processor is not available, the LUN is marked offline and becomes inaccessible (step 226). However, upon determination that an alternate storage processor is available, the storage processor communicates with the alternate storage processor to determine whether the storage processor can fail (also referred to herein as "panic") (step 214). Upon determination that the storage processor cannot fail, the LUN is marked offline and becomes inaccessible (step 226). Further, upon determination that the storage processor can fail, the storage processor is rebooted (step 218). Upon reboot of the storage processor, a host system redirects subsequent I/O operations to the LUN to the alternate storage processor (step 220). Further, if the error encountered in step 204 is neither a software error nor a critical error, the error is provided to a host (step 202).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing software errors in storage systems, the method comprising:
   detecting that a first processor of a storage system has a problem performing an I/O on a logical object, wherein the first processor has a first path to the logical object, wherein the problem includes a software error, wherein the storage system includes first and second processors, wherein the first processor has a primary responsibility for performing the I/O on the logical object;
   evaluating whether to transfer responsibility of performing the I/O on the logical object to the second processor of the storage system, wherein the second processor has a second path to the logical object, wherein evaluating whether to transfer responsibility of performing the I/O includes determining whether subsequently performing the I/O on the logical object by the first processor resolves the software error and based on the determination, determining whether the second processor is available for performing the I/O operation on the logical object;
   based on the determination that the software error has not been resolved and the second processor is available for performing the I/O on the logical object, transferring responsibility of performing the I/O on the logical object to the second processor of the storage system upon receiving an indication from the second processor that the first processor can fail, wherein responsibility of performing the I/O on the logical object is transferred to the second processor upon failure of the first processor, wherein the failure of the first processor includes reboot of the first processor; and
   based on the determination that the software error has not been resolved and the second processor is not available for performing the I/O on the logical object, making the logical object inaccessible to a user of the logical object without having to reboot the storage system.

2. The method of claim 1, further comprising:
based on the evaluation, determining whether to fail the logical object by making the logical object inaccessible.

3. The method of claim 1, further comprising:
retrying the I/O on the logical object upon detecting the problem.

4. The method of claim 3, further comprising:
based on the result of retrying the I/O, determining whether to fail the first processor of the storage system.

5. The method of claim 1, wherein the logical object comprises a set of LUNs on disk drives in a RAID group.

6. The method of claim 1, wherein the logical object is represented by a first object on the first processor of the storage system and by a second object on the second processor of the storage system.

7. The method of claim 6, wherein the first object communicates with the second object to determine whether the first processor can panic.

8. The method of claim 1, further comprising:
providing a status of the problem to the logical object.

9. The method of claim 2, further comprising:
making the logical object accessible upon successful reboot of the first and second processors of the storage system.

10. The method of claim 1, wherein the logical object is in communication with a RAID object and the RAID object is in communication with a physical object.

11. A system for use in managing software errors in storage systems, the system comprising:
first logic detecting that a first processor of a storage system has a problem performing an I/O on a logical object, wherein the first processor has a first path to the logical object, wherein the problem includes a software error, wherein the storage system includes first and second processors, wherein the first processor has a primary responsibility for performing the I/O on the logical object;
second logic evaluating whether to transfer responsibility of performing the I/O on the logical object to the second processor of the storage system, wherein the second processor has a second path to the logical object, wherein evaluating whether to transfer responsibility of performing the I/O includes determining whether subsequently performing the I/O on the logical object by the first processor resolves the software error and based on the determination, determining whether the second processor is available for performing the I/O operation on the logical object;
third logic transferring responsibility, based on the determination that the software error has not been resolved and the second processor is available for performing the I/O on the logical object, of performing the I/O on the logical object to the second processor of the storage system upon receiving an indication from the second processor that the first processor can fail, wherein responsibility of performing the I/O on the logical object is transferred to the second processor upon failure of the first processor, wherein the failure of the first processor includes reboot of the first processor; and
fourth logic making, based on the determination that the software error has not been resolved and the second processor is not available for performing the I/O on the logical object, making the logical object inaccessible to a user of the logical object without having to reboot the storage system.

12. The system of claim 11, further comprising:
fifth logic determining, based on the evaluation, whether to fail the logical object by making the logical object inaccessible.

13. The system of claim 11, further comprising:
fifth logic retrying the I/O on the logical object upon detecting the problem.

14. The system of claim 13, further comprising:
sixth logic determining, based on the result of retrying the I/O, whether to fail the first processor of the storage system.

15. The system of claim 11, wherein the logical object comprises a set of LUNs on disk drives in a RAID group.

16. The system of claim 11, wherein the logical object is represented by a first object on the first processor of the storage system and by a second object on the second processor of the storage system.

17. The system of claim 16, wherein the first object communicates with the second object to determine whether the first processor can panic.

18. The system of claim 11, further comprising:
fifth logic providing a status of the problem to the logical object.

19. The system of claim 12, further comprising:
sixth logic making the logical object accessible upon successful reboot of the first and second processors of the storage system.

20. The system of claim 11, wherein the logical object is in communication with a RAID object and the RAID object is in communication with a physical object.

* * * * *